(12) United States Patent
Chen et al.

(10) Patent No.: US 7,210,705 B2
(45) Date of Patent: May 1, 2007

(54) INCLINATION ADJUSTMENT DEVICE FOR ELECTRIC SCOOTER STEERING ASSEMBLY

(75) Inventors: Yung-Hsin Chen, Kaohsiung (TW); Tsung-Hsi Shih, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 223 days.

(21) Appl. No.: 11/092,663

(22) Filed: Mar. 30, 2005

(65) Prior Publication Data
US 2006/0225929 A1    Oct. 12, 2006

(51) Int. Cl.
*B62D 1/18*    (2006.01)

(52) U.S. Cl. .................. 280/775; 74/493; 180/65.1

(58) Field of Classification Search ............. 180/65.1, 180/180, 181, 907, 908; 280/263, 270, 771, 280/775, 779, 87.01, 87.03, 87.05; 74/493
See application file for complete search history.

(56) References Cited

U.S. PATENT DOCUMENTS

| | | | | | |
|---|---|---|---|---|---|
| 4,452,327 | A | * | 6/1984 | Mowat et al. | 180/11 |
| 4,570,739 | A | * | 2/1986 | Kramer | 180/216 |
| 4,750,578 | A | * | 6/1988 | Brandenfels | 180/13 |
| 5,238,082 | A | * | 8/1993 | Stegeman et al. | 180/208 |
| 6,139,057 | A | * | 10/2000 | Olgren et al. | 280/775 |
| 6,315,307 | B1 | * | 11/2001 | Chen et al. | 280/40 |
| 6,474,689 | B2 | * | 11/2002 | Mulhern et al. | 280/775 |
| 6,491,312 | B2 | * | 12/2002 | Reynolds et al. | 280/87.041 |
| 6,712,391 | B2 | * | 3/2004 | Cheng | 280/775 |
| 7,125,080 | B1 | * | 10/2006 | Jarema et al. | 297/411.32 |
| 7,134,359 | B2 | * | 11/2006 | Lin | 74/551.3 |

* cited by examiner

*Primary Examiner*—J. Allen Shriver
*Assistant Examiner*—Brian Swenson
(74) *Attorney, Agent, or Firm*—Leong C. Lei

(57) ABSTRACT

An adjustment device for the steering assembly of an electric scooter is provided. The adjustment device is at least composed of a body, two confining plates, an elastic element, a cam wheel member, two bearing rods, and a sliding shaft. The sliding shaft has its bottom end pin-joined to a joining seat of the electric scooter. The rest of the sliding shaft passes through the two confining plates and the elastic element positioned between the two confining plates, all of which are installed inside the body. The body in turn is pin-joined to a main shaft of the steering assembly. The wheel cam member has a wheel cam installed between the two confining plates and pin-joined to the body. The two bearing rods are inserted into the body from the top and bottom of the body respectively and function as pivoting points to the two confining plates. By operating the wheel cam member to release the confinement of the two confining plates to the sliding shaft, the sliding shaft could slide freely through the body of the adjustment device and thereby offer various degrees of inclination for the steering assembly.

5 Claims, 7 Drawing Sheets

INCLINATION ADJUSTMENT DEVICE FOR ELECTRIC SCOOTER STEERING ASSEMBLY

BACKGROUND OF THE INVENTION (a) Technical Field of the Invention

The present invention generally relates to the steering assembly of electric scooters, and more particularly to a device for adjusting the inclination of the steering assembly.

(b) Description of the Prior Art

Recently, electric scooters have been widely used among the elders and the handicapped to improve their mobility. Significant development efforts therefore have been directed toward enhancing the electric scooters in various aspects.

In general, an electric scooter is advanced by its built-in battery's supplying electricity to power the electric motor, which in turn drives the rear wheels via the transmission mechanism. A conventional electric scooter A, as shown in FIG. 1, mainly contains a body 1, a cover 2, and a seat assembly 3. The body 1 is composed of a steering assembly 11, a front wheel 12, rear wheels 13, a footrest 14, a power system 15, and an adjustment device 16. The cover 2 provides the housing for the power system 15 while the seat assembly 3 provides comfortable seating for a driver.

To ease the storage and transportation and to suit a driver's specific stature, there are electric scooters with an adjustable steering assembly 11. As shown in FIG. 2, the adjustable steering assembly 11 has a main shaft 111 pin-joined to a joining seat 141 in a front section of the footrest 14 by a pin rod 112 and the main shaft 111 could pivot around the pin rod 112. An adjustment device 16 is installed on a rear side of the main shaft 111. The adjustment device 16 is composed of a telescoping rod 16a having an hollow external rod 161 and an internal rod 163, and a releasing member 162.

The telescoping rod 16a has its top end pin-joined to a positioning seat 113 of the main shaft 111 by a pin rod 165, and its bottom end pin-joined to the joining seat 141. When the operation rod 1621 of the releasing member 162 releases the confinement exerted by the releasing member 162 on the internal rod 163, the internal rod 163 could be retracted into the external rod 161 and the length of the telescoping rod 16a could be adjusted. The steering assembly 11 therefore could have various degrees of inclination, as shown in FIG. 3.

When the steering assembly 11 is folded toward the footrest 14, a blocking element 166 at the bottom of the internal rod 163 and another blocking element 142 beneath the joining seat 141 jointly maintain a largest degree of inclination for the steering assembly 11, as shown in FIG. 4. On the other hand, the length of the telescoping rod 16a defines the largest elevation angle of the steering assembly 11. Even though the conventional adjustment device 16 has adequately allowed the steering assembly 11 for various degrees of inclination, the telescoping rod 16a has a rather high cost. Therefore, there is a need for a more cost effective adjustment device without sacrificing the function of the adjustable steering assembly.

SUMMARY OF THE INVENTION

The primary purpose of the present invention is to provide an adjustment device for the steering assembly of an electric scooter. The adjustment device is at least composed of a body, two confining plates, an elastic element, a cam wheel member, two bearing rods, and a sliding shaft. The sliding shaft has its bottom end pin-joined to a joining seat of the electric scooter. The rest of the sliding shaft passes through the two confining plates and the elastic element positioned between the two confining plates, all of which are installed inside the body. The body in turn is pin-joined to a main shaft of the steering assembly. The wheel cam member has a wheel cam installed between the two confining plates and pin-joined to the body. The two bearing rods are inserted into the body from the top and bottom of the body respectively and function as pivoting points to the two confining plates. By operating the wheel cam member to release the confinement of the two confining plates to the sliding shaft, the sliding shaft could slide freely through the body of the adjustment device. The steering assembly therefore could have various degrees of inclination.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
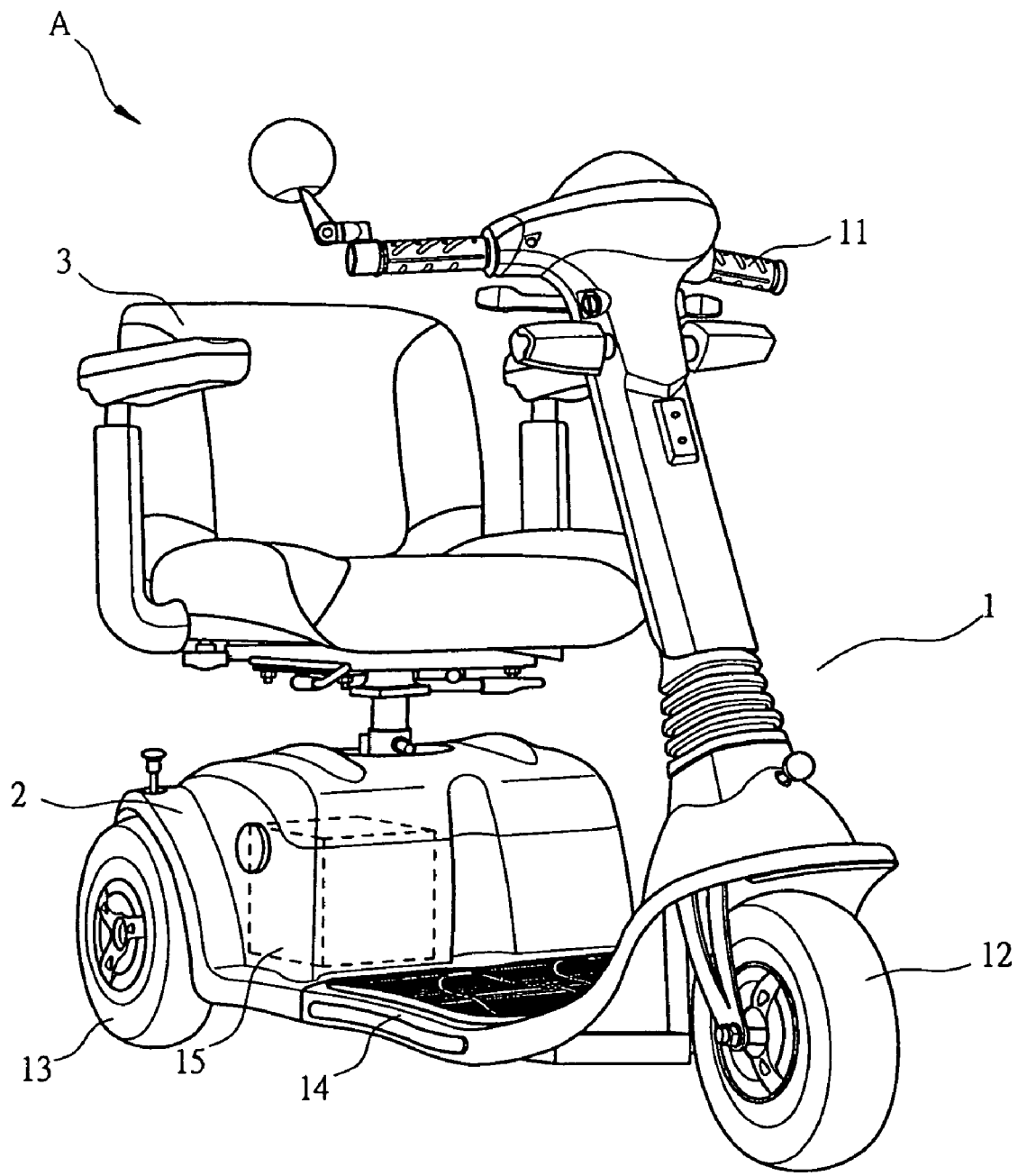
FIG. 1 is a perspective view of a conventional electric scooter.
Figure 2:
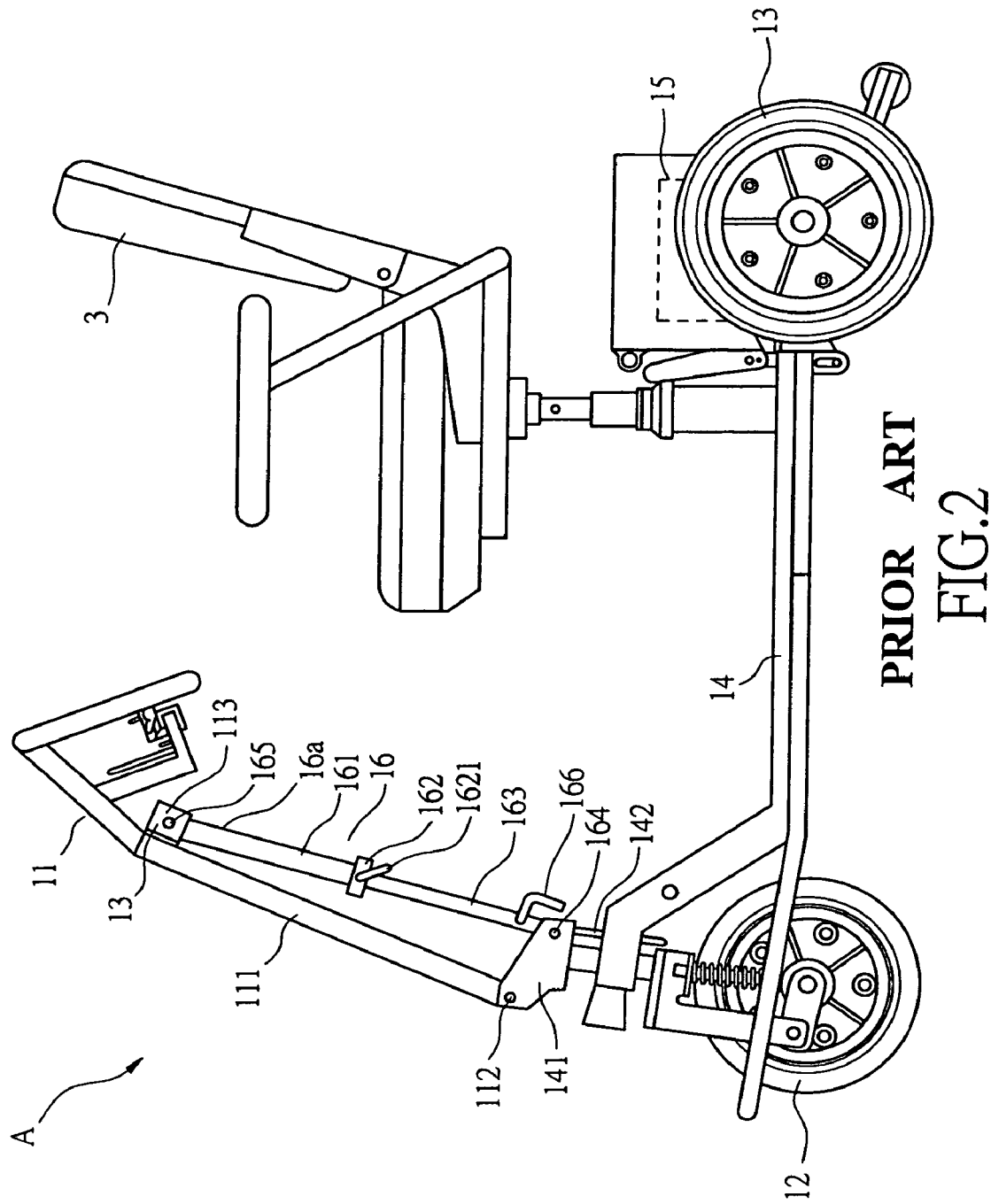
FIG. 2 is a side view of a conventional electric scooter.
Figure 4:
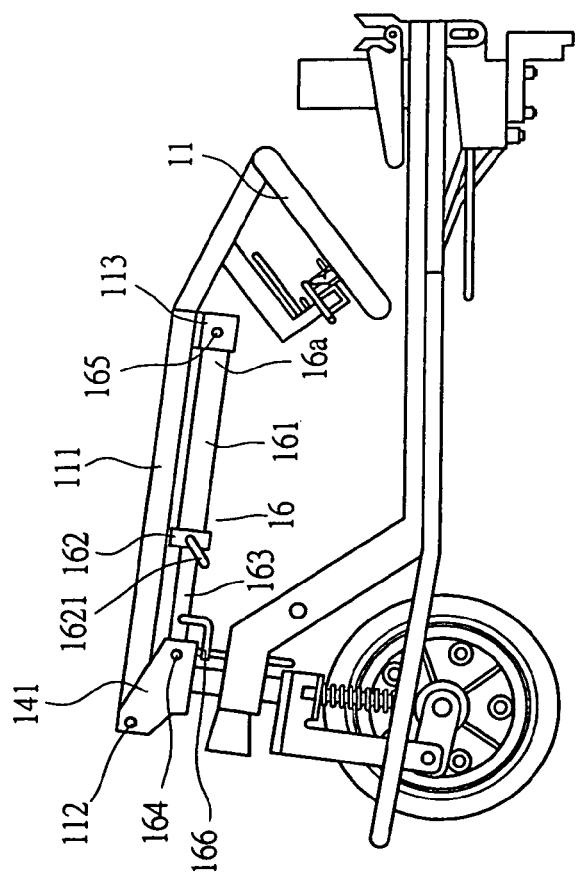
FIG. 4 is side view showing a fully folded steering assembly of FIG. 2.
Figure 3:
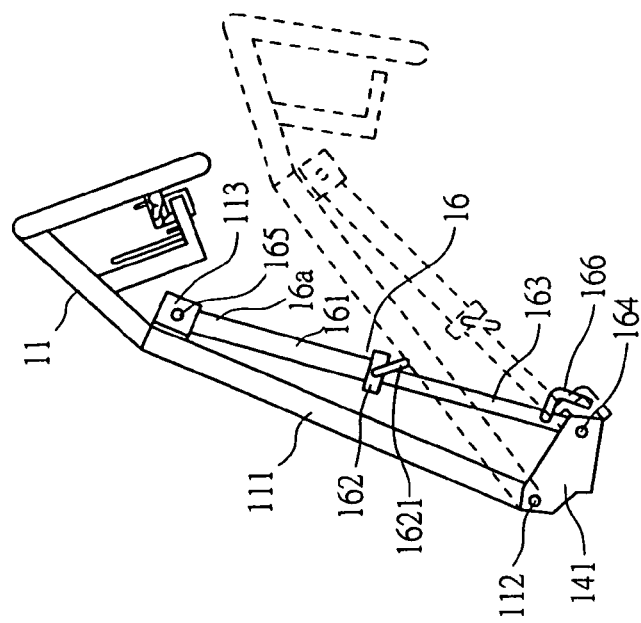
FIG. 3 is a schematic view showing the function of an adjustment device of FIG. 2.
Figure 5:
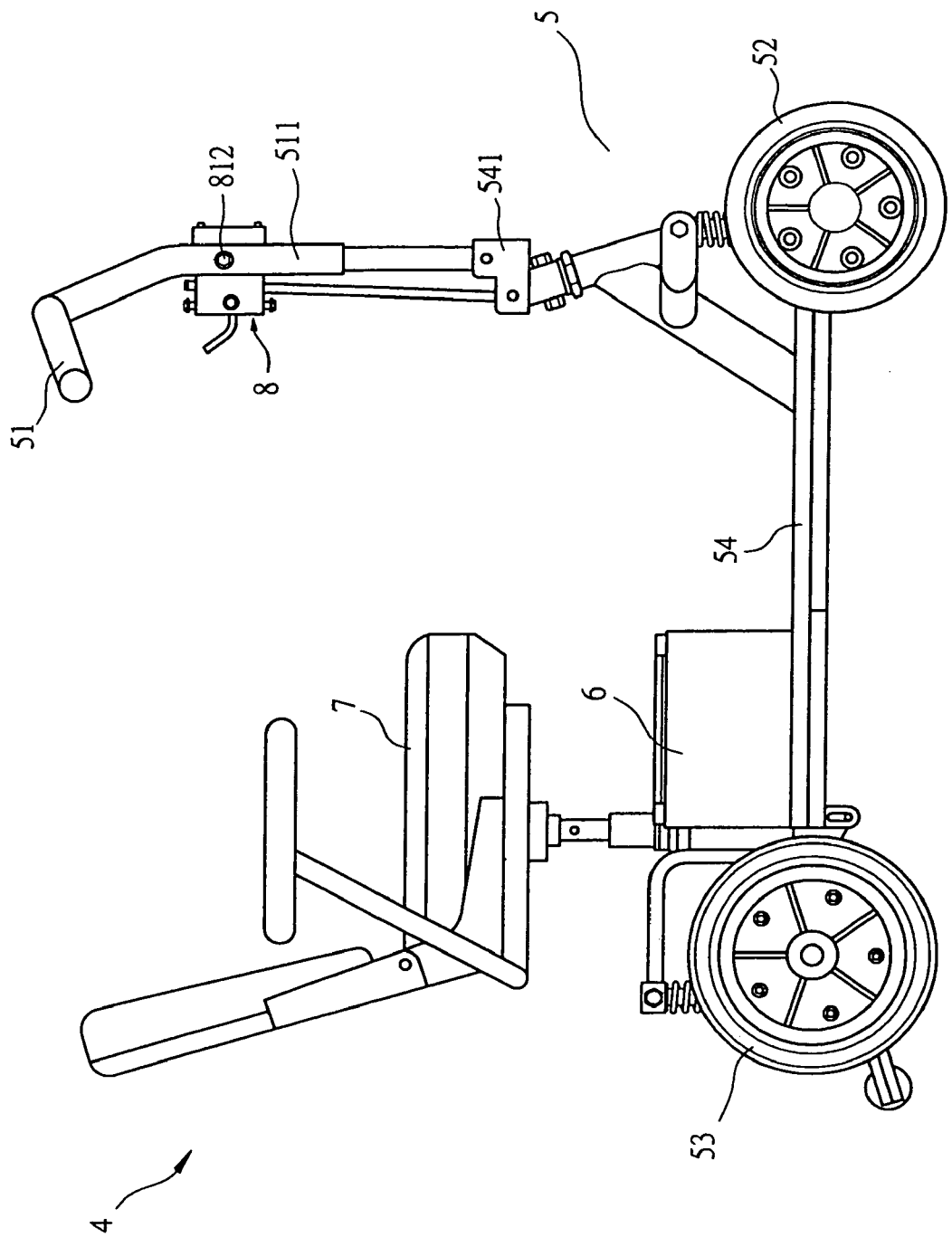
FIG. 5 is a side view of an electric scooter according to an embodiment of the present invention.

FIG. 5 is an electric scooter according to an embodiment of the present invention. As illustrated, the electric scooter 4 is at least composed of a body 5, a power unit 6, and a seat assembly 7.

The body 5 contains a steering assembly 51, a front wheel 52, back wheels 53, and a footrest 54. A main shaft 511 of the steering assembly 51 is pin-joined to a joining seat 541 in a front section of the footrest 54.

The power unit 6 provides an impelling force to drive the back wheels 53 and thereby the electric scooter 4 to advance.

The seat assembly 7 provides comfortable seating for a driver of the electric scooter 4.

The adjustment device 8 of the present embodiment is installed at the rear (facing the seat assembly 7) of the steering assembly 51. With the adjustment device 8, the inclination of the steering assembly 51 is adjustable to suit the driver's specific stature.

Figure 6:
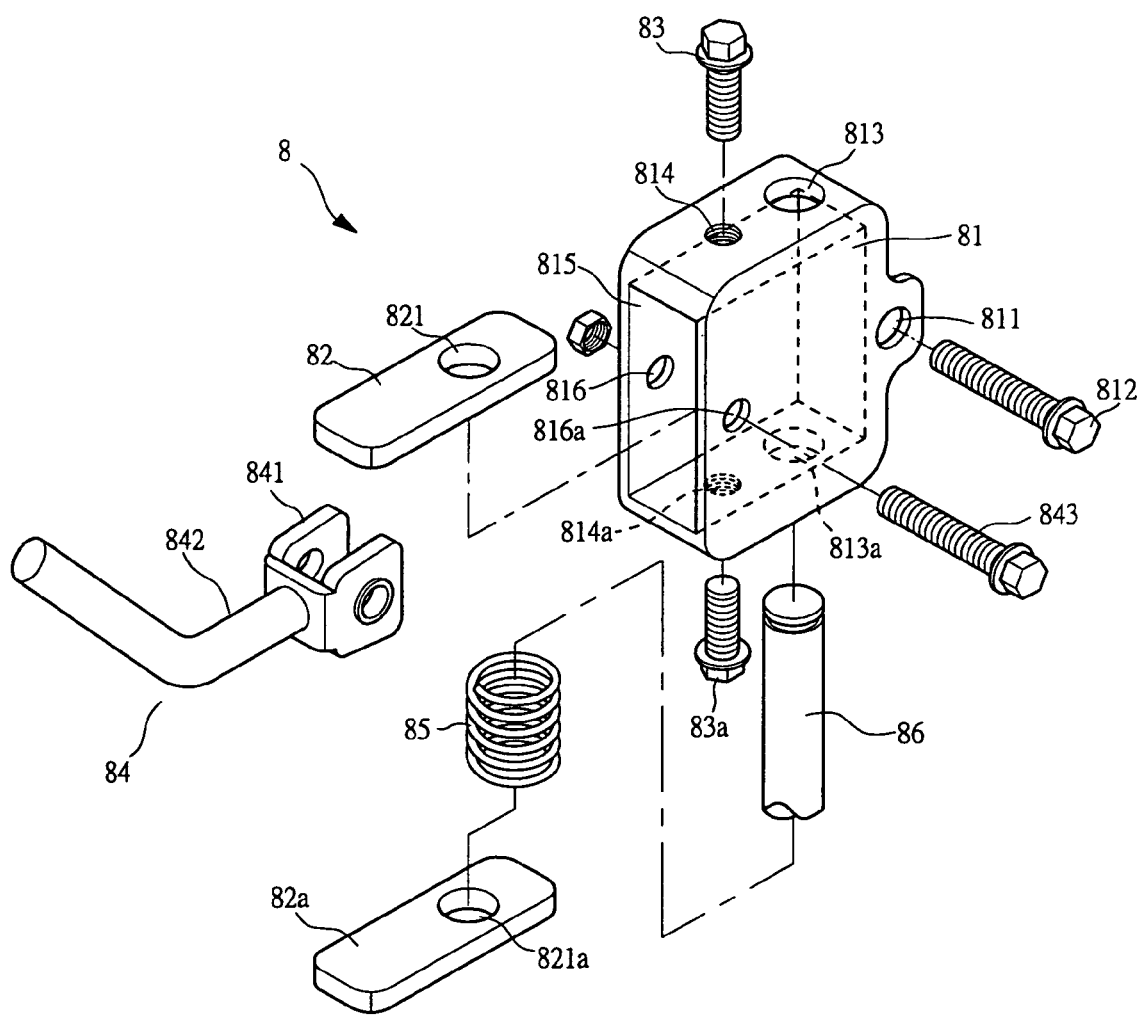
FIG. 6 is a perspective explosion view of an adjustment device according to an embodiment of the present invention.

As illustrated in FIG. 6, the adjustment device 8 is at least composed of a hollow body 81, two confining plates 82 and 82a, two bearing rods 83 and 83a, a cam wheel member 84, an elastic element 85, and a sliding shaft 86.

On a side of the body 81, there is a pin hole 811 so that the adjustment device 8 is pin-joined to a main shaft 511 of the steering assembly 51 by a pin rod 812. On both a top and bottom sides (relative to a driver sitting on the seat assembly 7) of the body 81, there are through holes 813 and 813a opposite to each other, allowing the sliding shaft 86 to pass through the body 81. Also on the top and bottom sides of the body 81 and besides the through holes 813 and 813a, there are through holes 814 and 814a, through which the bearing rods 83 and 83a are installed. On a rear side (facing the seat assembly 7) of the body 81, there is an opening 815 allowing the cam wheel member 84 to be embedded inside the body 81. The cam wheel member 84 is pin-joined to the body 81 by another pin rod 843 inserted through the through holes 816 and 816a on a left and right sides (relative to a driver sitting on the seat assembly 7) of the body 81 respectively.

On an end of the two confining plates 82 and 82a, there are through holes 821 and 821a. The elastic element 85 is positioned between the two confining plates 82 and 82a. The sliding shaft 86 passes through the two confining plates 82 and 82a via the through hole 821a, the elastic element 85, and the through hole 821.

The two bearing rods 83 and 83a are screwed into the body 81 via the through holes 814 and 814a until their tips pressing against the two confining plates 82 and 82a respectively. When the cam wheel member 84 is moved pivotally around the pin rod 843, the two confining plates 82 and 82a would be pushed to swing around the tips of the bearing rods 83 and 83a. By adjusting the depth of the two bearing rods 83 and 83a into the body 81, the two confining plates 82 and 82a are in closed contact with the cam wheel member 84.

The cam wheel member 84 is at least composed of a cam wheel 841 and an operation rod 842. The cam wheel member 84 is positioned between the two confining plates 82 and 82a and pin-joined to the body 81 by the pin rod 843 inserted through the through holes 816 and 816a.

The sliding shaft 86, as a long rod, has a bottom end (relative to a driver sitting on the seat assembly 7) pivotally joined to the joining seat 541 in the front section of the footrest 54. The sliding shaft 86 passes through the two confining plates 82 and 82a and the elastic element 85 inside the body 81. The steering assembly 51 could be inclined toward or away from the driver by having the sliding shaft 86 pivot around the joining seat 541.

Figure 7:
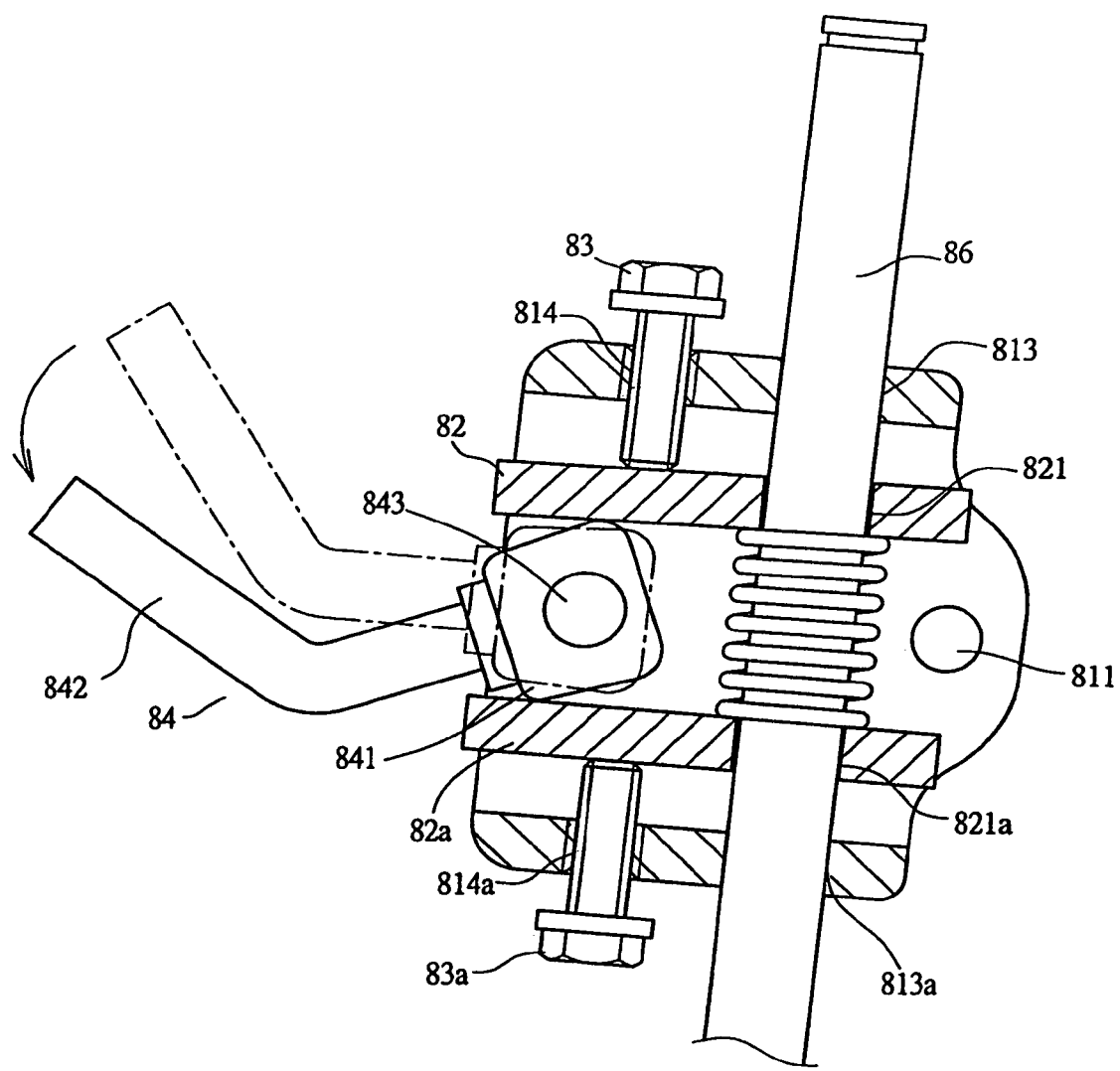
FIG. 7 is a schematic view showing the function of the adjustment device of FIG. 6.
Figure 8:
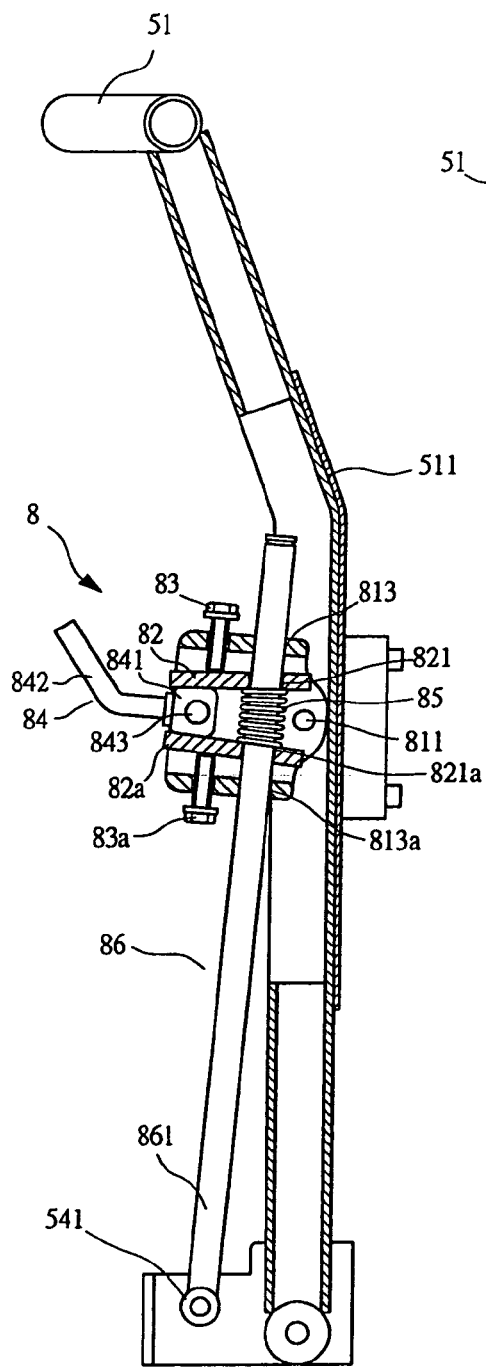
FIGS. 8 and 9 are side views showing the operation of the adjustment device of FIG. 6.
Figure 9:
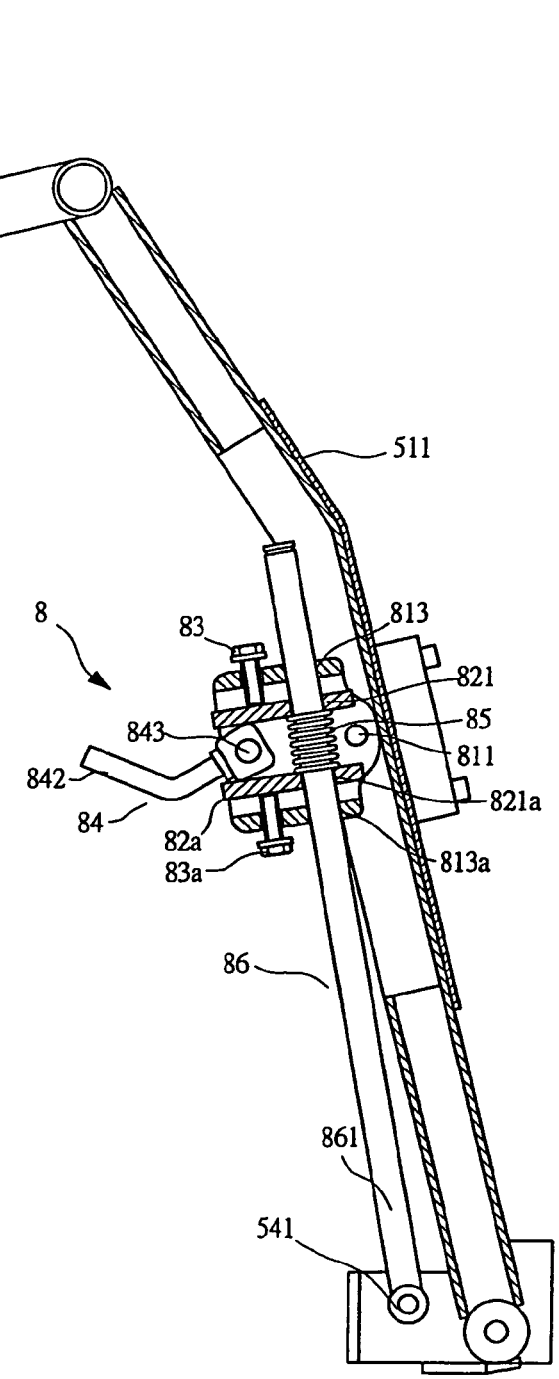

The present embodiment functions as illustrated in FIG. 7. Originally, the two confining plates 82 and 82a, pressed by the bearing rods 83 and 83a to have one of their ends toward each other, are not in parallel. When the operation rod 842 is pushed downward, the rotation of the cam wheel 841 causes the two confining plates 82 and 82a to pivot around the bearing rods 83 and 83a respectively and compress the elastic element 85. When the two confining plates 82 and 82a, and thereby their through holes 821 and 821a, are parallel to each other, the steering assembly 51 could be pulled toward or pushed away from the driver as the sliding shaft 86 slides through the through holes 821 and 821a. As shown in FIGS. 8 and 9, when the steering assembly 51 reaches the desired inclination, the operation rod 842 is released and the elastic element 85 rebounds to push the confining plates 82 and 82a back to their originally slant orientation. The sliding shaft 86 is stuck and cannot slide freely through the through holes 821 and 821a. The steering assembly 51 is therefore fixed at the specific inclination.

The major function of the present invention lies in the cam wheel member 84's releasing the confinement exerted on the sliding shaft 86 by the two confining plates 82 and 82a. The sliding shaft 86 is therefore able to slide through the body 81, allowing the steering assembly to have various degree of inclination.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An adjustment device for a steering assembly of an electric scooter, comprising a body, two confining plates, an elastic element, a cam wheel member, two bearing rods, and a sliding shaft, wherein said sliding shaft has its bottom end pin-joined to a joining seat of said electric scooter, the rest of said sliding shaft passes through said two confining plates and said elastic element positioned between said two confining plates, all of which are installed inside said body, said body in turn is pin-joined to a main shaft of said steering assembly, said wheel cam member has a wheel cam installed between said two confining plates and pin-joined to said body, said two bearing rods are inserted into said body from the top and bottom of said body respectively and function as pivoting points to said two confining plates, an operation of said wheel cam member releases the confinement of said two confining plates to said sliding shaft so that said sliding shaft could slide freely through said body of said adjustment device and thereby offer various degrees of inclination for said steering assembly.

2. The adjustment device for a steering assembly of an electric scooter according to claim 1, wherein said joining seat is at a front section of a footrest of said electric scooter.

3. The adjustment device for a steering assembly of an electric scooter according to claim 1, said cam wheel member comprises a wheel cam and an operation rod.

4. The adjustment device for a steering assembly of an electric scooter according to claim 1, wherein said adjustment device is installed to the rear of said main shaft of said steering assembly.

5. The adjustment device for a steering assembly of an electric scooter according to claim 1, wherein the depth of said bearing rods into said body is adjustable.

* * * * *